United States Patent [19]
Sasanuma et al.

[11] Patent Number: 5,697,012
[45] Date of Patent: Dec. 9, 1997

[54] METHOD AND APPARATUS FOR COLOR IMAGE FORMATION WITH GRADATION CONTROL CAPABILITY

[75] Inventors: Nobuatsu Sasanuma, Yamato; Koji Amemiya, Tokyo; Tatsuo Takeuchi; Hisashi Fukushima, both of Kawasaki; Haruhiko Moriguchi; Takao Ogata, both of Yokohama, all of Japan

[73] Assignee: Canon Kabushiki Kaisha, Tokyo, Japan

[21] Appl. No.: 428,792

[22] Filed: Apr. 24, 1995

Related U.S. Application Data

[63] Continuation of Ser. No. 838,967, Feb. 21, 1992, abandoned.

[30] Foreign Application Priority Data

Feb. 22, 1991 [JP] Japan .................. 3-028765

[51] Int. Cl.[6] ........................ G03G 15/00
[52] U.S. Cl. .................. 399/49; 347/115; 358/518; 358/519
[58] Field of Search ............... 355/245, 219, 355/208, 246, 228, 233, 326 R, 327, 200, 203; 347/119, 900, 232, 115; 118/688–691, 693, 694; 356/445, 446, 448; 399/46, 49, 50, 51, 53, 72; 358/519, 518

[56] References Cited

U.S. PATENT DOCUMENTS

| | | | |
|---|---|---|---|
| 4,113,371 | 9/1978 | Fraser et al. | 355/246 X |
| 4,504,137 | 3/1985 | Aoki et al. | 355/321 |
| 4,888,636 | 12/1989 | Abe | 355/326 X |
| 4,894,685 | 1/1990 | Shoji | 355/326 X |
| 4,950,905 | 8/1990 | Butler et al. | 355/246 X |
| 4,989,985 | 2/1991 | Hubble, III et al. | 356/445 |
| 5,083,161 | 1/1992 | Borton et al. | 355/208 |
| 5,204,538 | 4/1993 | Genovese | 356/448 X |

*Primary Examiner*—S. Lee
*Attorney, Agent, or Firm*—Fitzpatrick, Cella, Harper & Scinto

[57] ABSTRACT

A color image forming method and apparatus in which toner patterns, formed by toners of different colors, on an image bearing member, can be detected by a single sensor. Near-infrared light is emitted from an LED at each formation of a single-colored pattern on the photosensitive drum and the amount of near-infrared light reflected from the drum is detected by the sensor, for the purpose of effecting gradation control.

27 Claims, 15 Drawing Sheets

F I G. 10
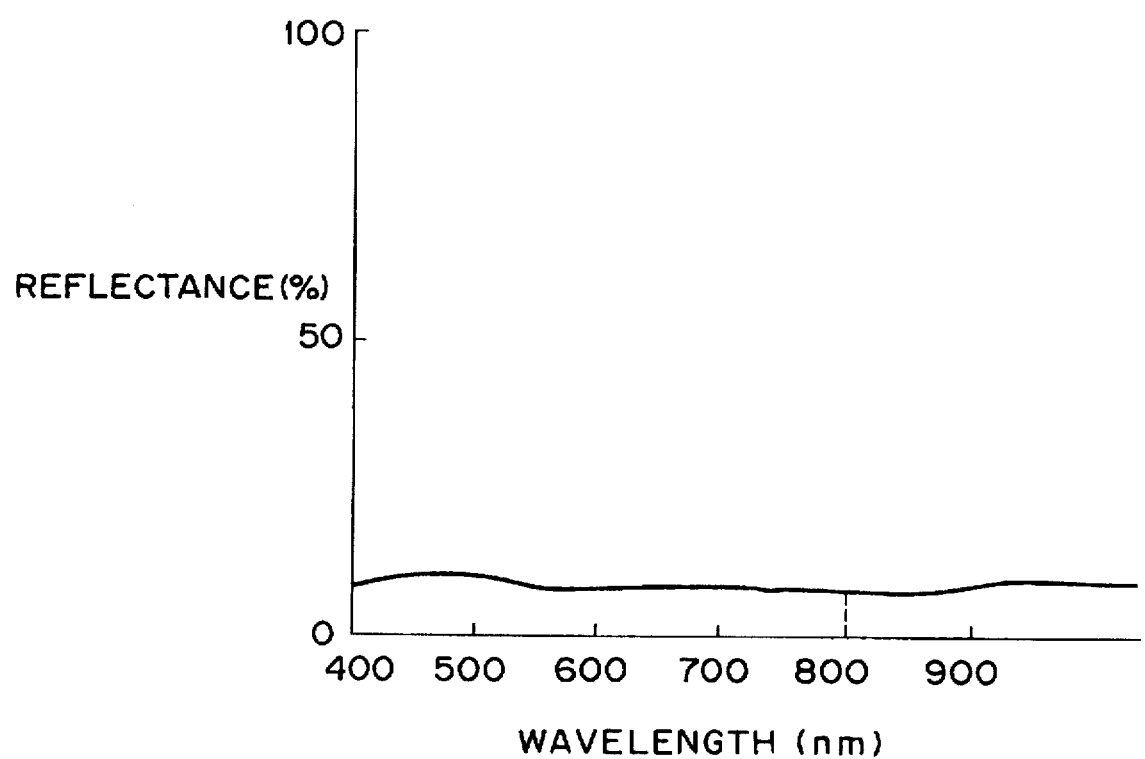

METHOD AND APPARATUS FOR COLOR IMAGE FORMATION WITH GRADATION CONTROL CAPABILITY

This application is a continuation of application Ser. No. 07/838,967 filed Feb. 21, 1992, now abandoned.

BACKGROUND OF THE INVENTION

1. Field of the Invention

The present invention relates to a color image forming apparatus for forming a color image, utilizing recording materials of plural colors.

2. Related Background Art

There is already known a method for stabilizing the image quality, as disclosed in U.S. Pat. No. 4,888,636 and in U.S. patent application Ser. No. 07/760,505, filed Sep. 16, 1991, by forming a specific pattern on an image bearing member, reading the optical density of the pattern and effecting feedback control on the image forming conditions, such as a gamma correction curve.

In the above-mentioned technologies, however, since a visible light source is employed for detecting the densities of toners of plural colors present on the image bearing member, it is necessary to switch color-separation filters mounted on the sensors or to assign exclusive sensor respectively to different colors, and as a result the number of component parts becomes inevitably large.

Also, in recent years, the running cost for black monochromatic copying is required, even in a full-color copying machine, to be comparable to that in the conventional monochromatic copying machine. For this reason, the developing method for black may be different from those for other colors, so that the light reflecting property of black toner may be different from those of other toners.

More specifically, in a case where the cyan, magenta and yellow toners show a reflective response to the irradiating light while the black toner alone shows an absorptive response, there has not been proposed a configuration capable of efficiently detecting such toners.

SUMMARY OF THE INVENTION

An object of the present invention is to resolve the above-mentioned drawbacks and to provide a color image forming apparatus which itself is capable of optimizing the image forming conditions.

The above-mentioned object can be attained, according to the present invention, by a color image forming apparatus having a function of automatically adjusting a processing condition of color image forming means, comprising: pattern forming means for forming a visible pattern on a recording medium, utilizing recording materials of plural colors; irradiation means for irradiating the visible pattern with near-infrared light; detecting means for detecting the near-infrared light, emitted by the irradiation means and reflected by the recording medium; and adjusting means for adjusting the process condition, utilizing the near-infrared light detected by the detecting means.

Another object of the present invention is to detect the densities of developing materials of plural colors using a simple structure.

The above-mentioned object can be attained, according to the present invention, by a color image forming apparatus comprising pattern forming means for forming a visible pattern on a recording medium, utilizing recording materials of plural colors; irradiation means for irradiating the visible pattern with near-infrared light; and detecting means for detecting the near-infrared light emitted by said irradiation means and reflected by the recording medium.

Still another object of the present invention is to provide an image forming apparatus with a mode for optimizing the color forming conditions.

The above-mentioned object can be attained, according to the present invention, by a color image forming apparatus comprising pattern forming means for forming a visible pattern on a recording medium, utilizing recording materials of plural colors; and mode selecting means for selecting either a first mode, for adjusting the conditions of formation of the visible pattern by the pattern forming means by irradiating the visible pattern with near-infrared light, or a second mode, for forming the visible pattern with the conditions adjusted by the first mode.

Still another object of the present invention is to provide a color image forming apparatus capable of detecting the density of a toner pattern of a single color, formed on a recording medium, utilizing same density detecting means for toners of different colors.

Still another object of the present invention is to detect patterns of plural colors, formed on a recording medium, in precise manner.

Still other objects of the present invention, and the embodiments thereof, will become fully apparent from the following description to be taken in conjunction with the attached drawings, and from the appended claims.

BRIEF DESCRIPTION OF THE DRAWINGS

FIG. 10 is a chart showing an example of spectral characteristics of two-component carbon-containing black toner;

DETAILED DESCRIPTION OF THE PREFERRED EMBODIMENTS

Now the present invention will be clarified by explanation in detail of the preferred embodiments thereof.
[Embodiment 1]

Figure 1:
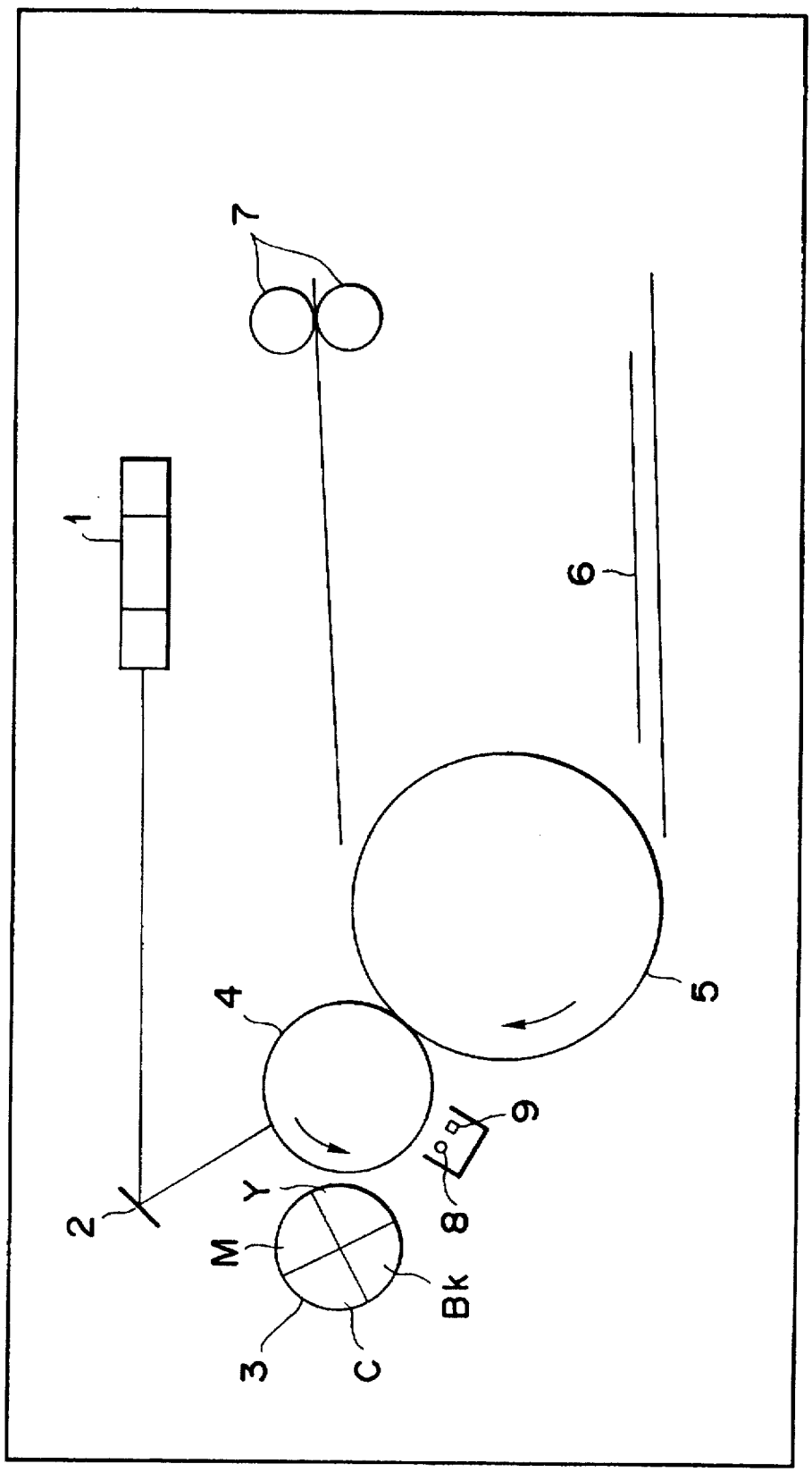
FIG. 1 is a schematic view of an embodiment of the present invention.

FIG. 1 illustrates an embodiment of the present invention, in which the image signal is converted by a laser driver and a laser unit (both not shown) into a laser beam. The laser beam is reflected by a polygonal mirror 1 and a mirror 2 and irradiates a photosensitive drum 4. The drum 4, bearing a latent image formed by the scanning with the laser beam, rotates in a direction indicated by an arrow, and the latent image is developed in each color by a rotary developing unit 3. (FIG. 1 illustrates the state in which development with yellow toner is proceeding.)

A transfer sheet 6 is wound on a transfer drum 5, which makes a full turn for each color, in the order Y (yellow), M (magenta), C (cyan) and BK (black), whereby an image transfer is completed by 4 turns in total. In this manner the image formation with plural colors is conducted frame-sequentially.

After the image transfer, the transfer sheet 6 is separated from the transfer drum 5 and is subjected to fixation by paired fixing rollers 7, whereby a color image print is completed.

For reading a gradation pattern to be explained later, there are provided an LED 8 serving as irradiating means for emitting near-infrared light (800–2000 nm, having a main wavelength for example at ca. 960 nm), and a photosensor 9 (photoelectric converting device such as CCD) for receiving the near-infrared light reflected by the photosensitive drum 4.

Figure 2:
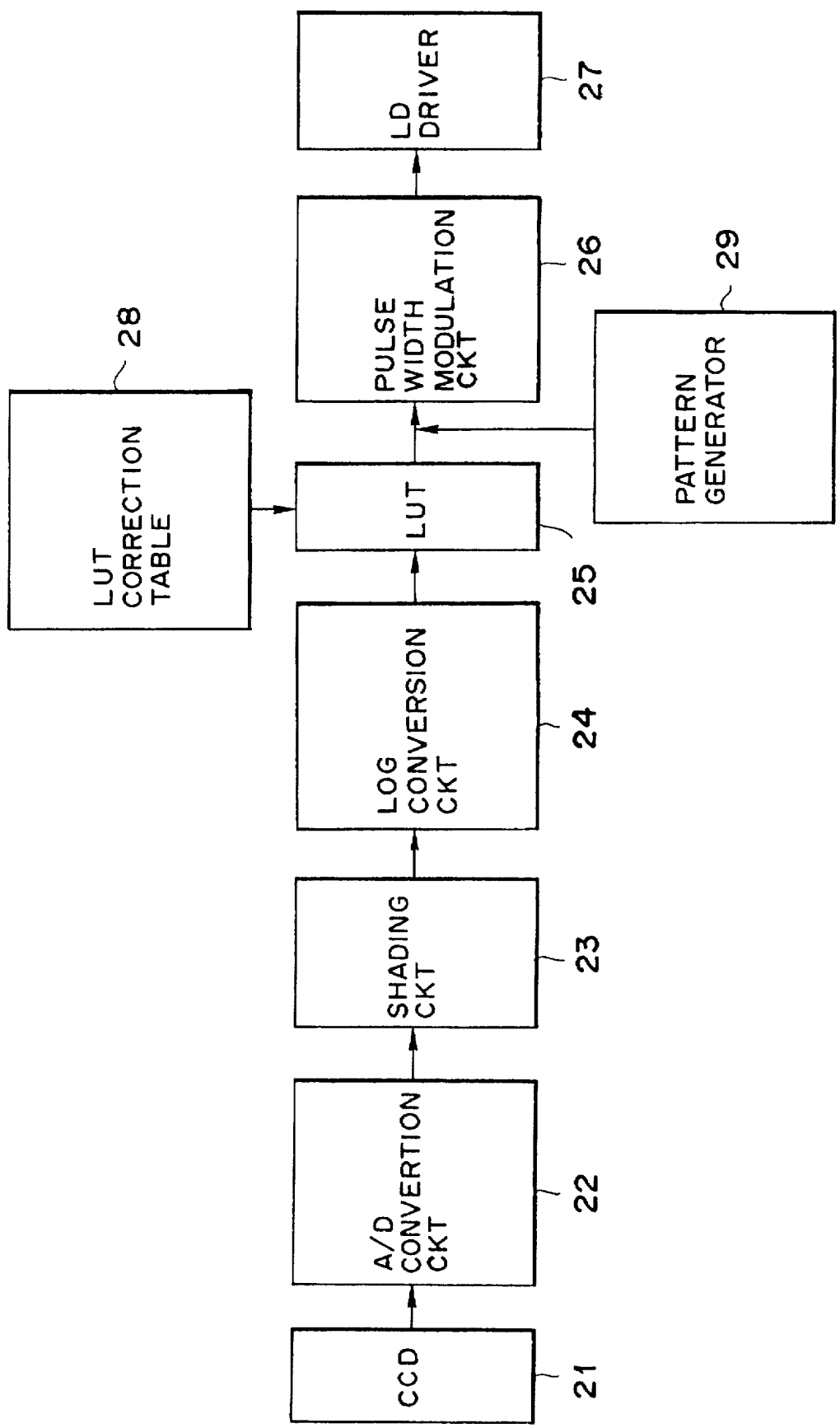
FIG. 2 is a block diagram of a circuit for processing electric signals from a CCD.

FIG. 2 shows an image signal processing circuit employed in the present embodiment for obtaining an image with gradation.

Luminance signals are obtained from an original image by means of a CCD 21, and are converted by an A/D conversion circuit 22 into digital luminance signals.

The digital luminance signals are subjected to correction for sensitivity fluctuation of the CCD elements in a shading correction circuit 23, and the corrected luminance signals are converted by a logarithmic conversion circuit 2 into density signals, which are then converted by a look-up table (LUT) 25 in such a manner that the output image density coincides with the original image density, according to the gamma characteristics initially set in a 10 printer. The LUT 25 is composed of a RAM, and is to be corrected by a LUT correction table 28 generated by the results of calculation to be explained later.

After conversion by the LUT 25, the obtained signals are converted, by a pulse width modulation circuit 26, into signals corresponding to dot widths, and supplied to a laser driver 27. By the laser beam scanning on the photosensitive drum 4, there is formed a latent image with gradation represented by the change in dot area, and an image with gradation is obtained through the steps of image development, image transfer and image fixation.

The above-explained image forming apparatus is further provided, as shown in FIG. 2, with a pattern generator for generating test pattern on the photosensitive drum 4.

Figure 12:
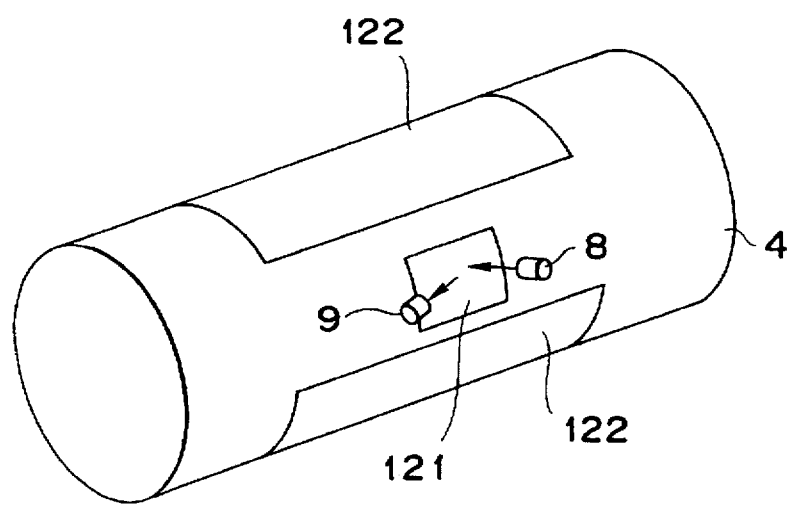
FIG. 12 is a view showing the mode of pattern formation on a photosensitive drum.

FIG. 12 shows the mode of formation, on the photosensitive drum 4, of a specified pattern 121 generated by the test pattern generator 29. The pattern 121 is formed, at the center of the photosensitive drum, in a non-image area outside an image area 122 where the image is formed in the ordinary print mode. The thus formed pattern is irradiated by the near-infrared light emitted by the LED 8, and the reflected light is received by the photosensor 9.

The toner concentration in the developing unit can be maintained constant by forming a specified pattern on an image bearing member, measuring the pattern with the LED 8 and the sensor 9 at a suitable timing, and determining the amount of toner replenishment from the difference between the measured amount of near-infrared light and the amount of the near-infrared light received from the same specified pattern when the toner concentration in the developing unit is at a suitable level.

When the specified pattern is formed for this purpose, it is preferably formed in an area of the photosensitive drum 4, not used for image formation, namely in a non-image area, as shown in FIG. 12.

Figure 3:
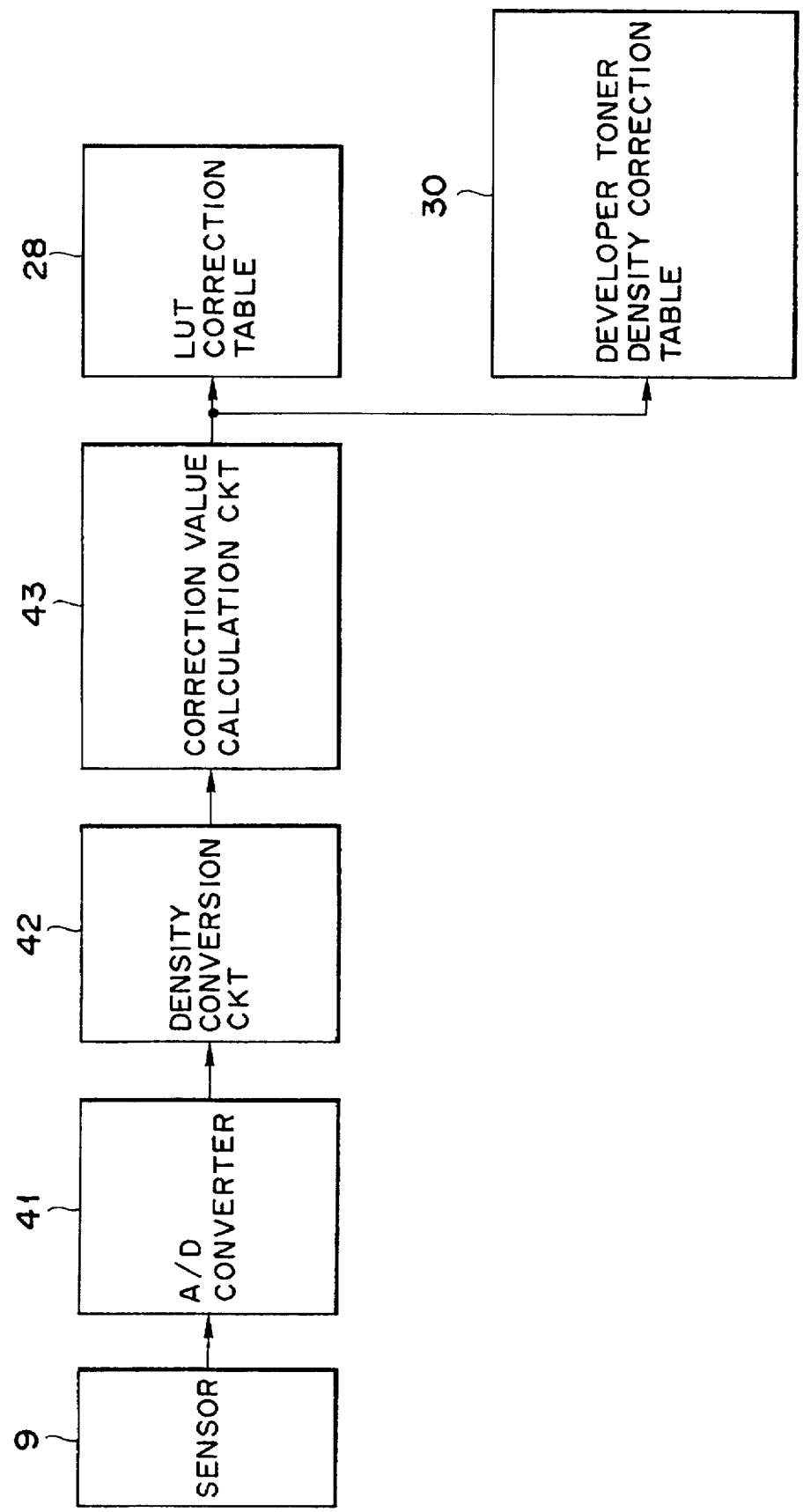
FIG. 3 is a block diagram of a circuit for processing electrical signals from a sensor 9.
Figure 9:
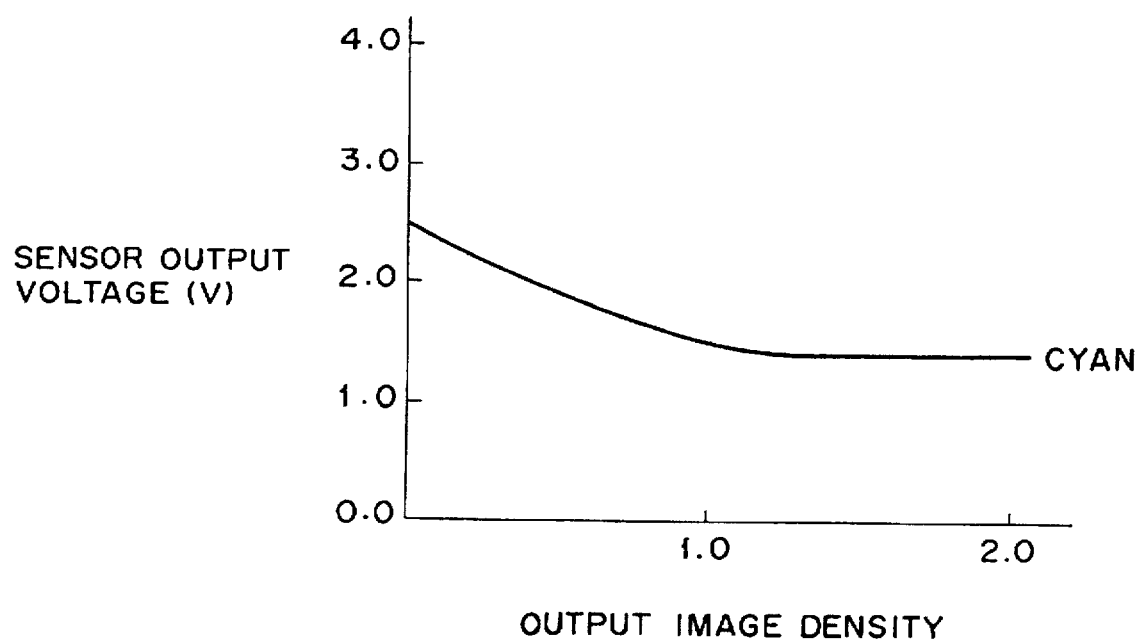
FIG. 9 is a chart showing an example of the relationship between the output image density and the sensor output in case visible light is used.

FIG. 3 shows a circuit for processing the signal from the sensor 9. The near-infrared light entering the sensor 9 is converted therein into an electrical signal, which includes an offset voltage of ca. 2.5 V as shown in FIG. 9. The signal is converted by an A/D converter 41 into a digital signal, and converted by a density conversion circuit 42 into a density signal. Based on the thus-converted density, a correction value calculation circuit 43 calculates a correction value. According to the correction value, a suitable table is selected in the LUT correction table 28 and the developer toner concentration (or density) correction table 30.

Thus, constant gradation can be maintained by measuring a specified gradation pattern with the LED 8 and the sensor 9 at a suitable timing, determining the gradation characteristics of the apparatus from a group of density values, and, if the gradation is aberrated from the ideal state, effecting feedback control on the gradation correction circuit 43 for correcting at least one parameter among the amount of primary charging, amount of laser light emission, light emitting time, intensity of the light source of the reader, developing voltage, LUT for gamma-correction etc.

Figure 4:
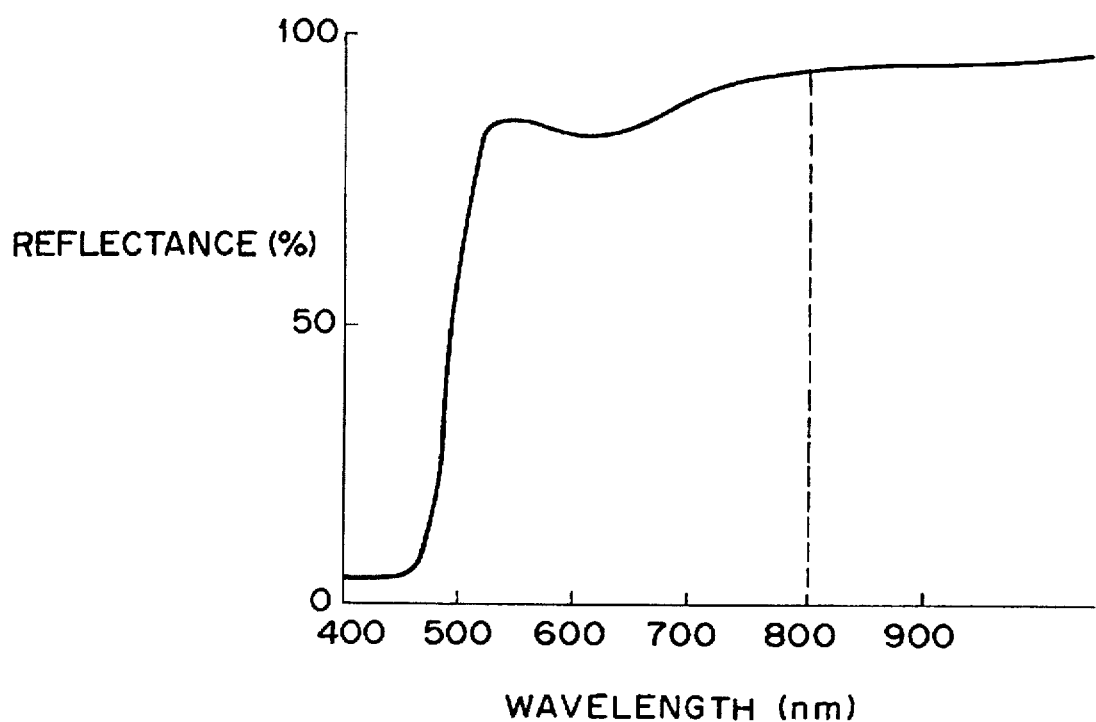
FIG. 4 is a chart showing an example of spectral characteristics of yellow toner.
Figure 5:
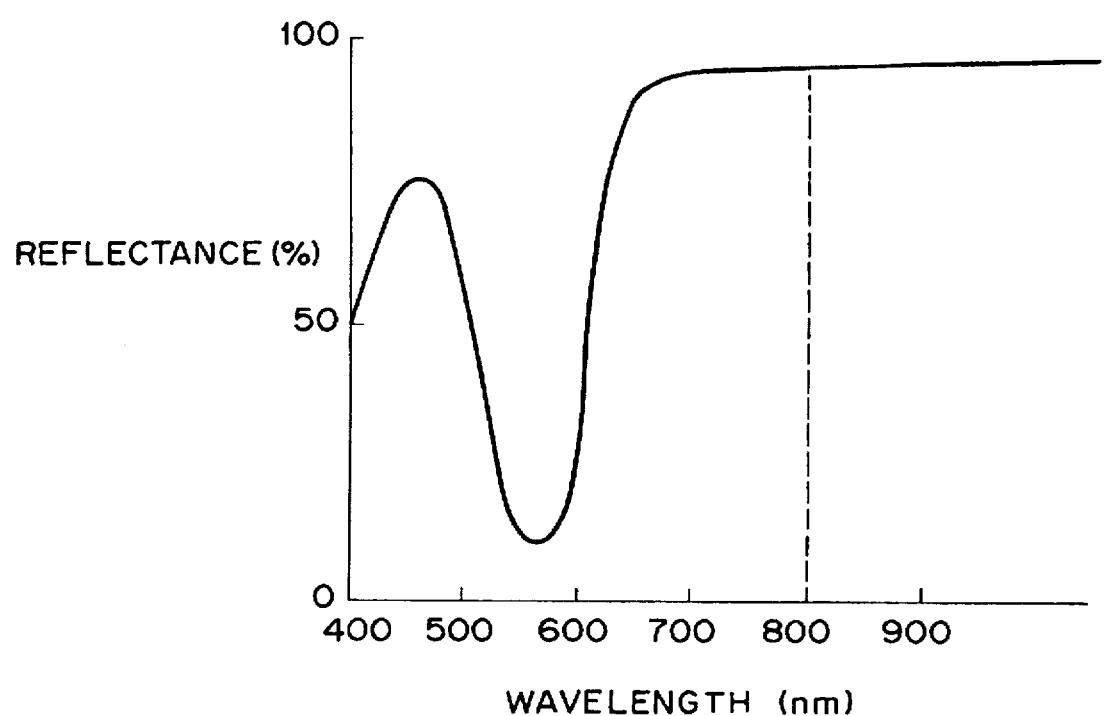
FIG. 5 is a chart showing an example of spectral characteristics of magenta toner.
Figure 6:
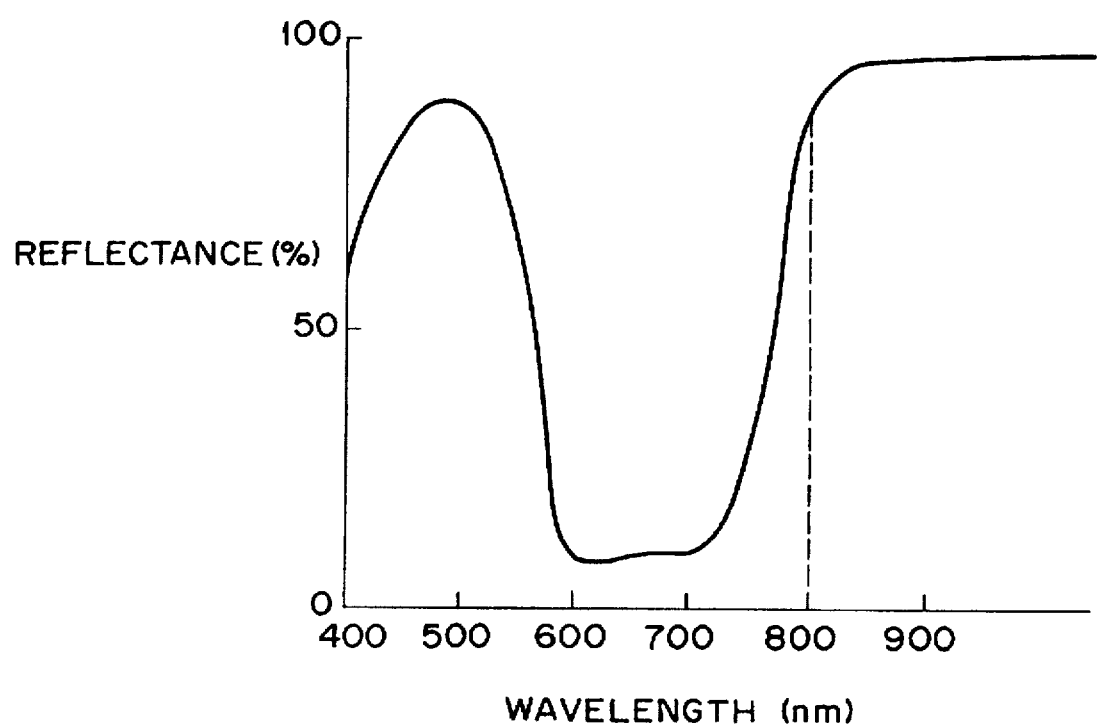
FIG. 6 is a chart showing an example of spectral characteristics of cyan toner.

The toners employed in the present embodiment are colored in yellow, magenta and cyan, and are obtained by dispersing coloring materials of respective colors in a binder material composed of a styrene copolymer resin. The yellow, magenta and cyan toners, having spectral characteristics respectively shown in FIGS. 4 to 6, can provide a reflectance of at least 80% in the near-infrared region (960 nm). The image formation with these colored toners is conducted with 2-component development, which is advantageous in color purity and transmittance. The particle size of the toner is 8–12 μm in volumic average, and is obtained by known crushing methods. It was also confirmed that similar results could be obtained with color toners prepared by suspension polymerization.

Figure 7:
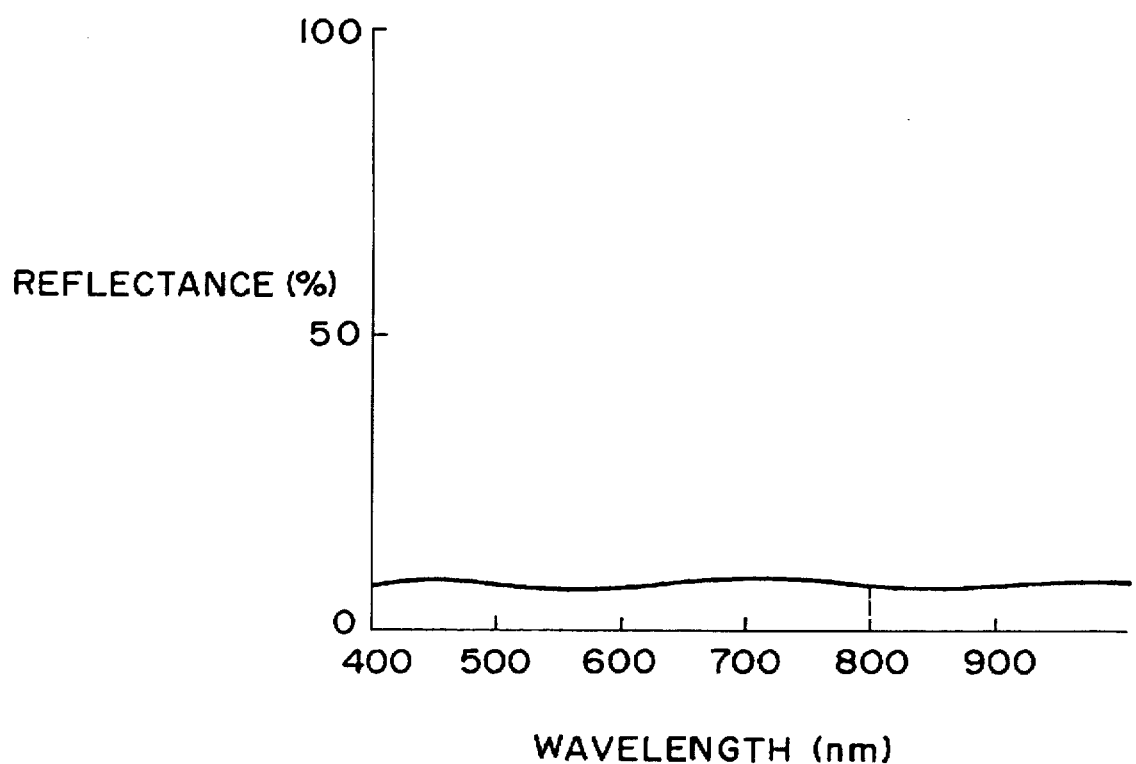
FIG. 7 is a chart showing an example of spectral characteristics of one-component magnetic black toner.
Figure 14:
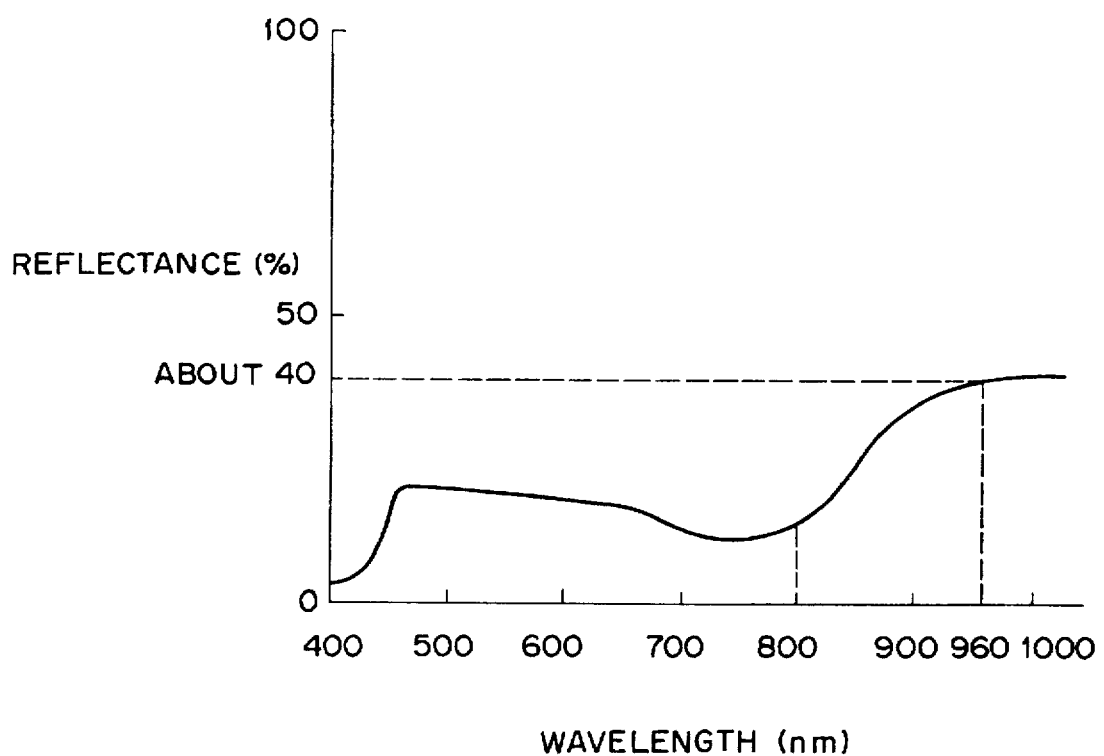
FIG. 14 is a chart of reflecting characteristics of the photosensitive drum.

On the other hand, the black toner employed in the present embodiment is composed of one-component magnetic toner, which is already known to be effective in achieving a low running cost in monochromatic copying and has a reflectance of about 10% in the near-infrared region (960 nm) as shown in FIG. 7. The average particle size and the particle shape are similar to those of the 2-component toner mentioned above. For the black toner, there was employed one-component jumping development. The photosensitive drum 4 is composed of an organic photoconductor, with a reflectance of about 40% in the near-infrared region (960 nm). The reflection characteristics of the photosensitive drum are shown in FIG. 14.

Figure 8:
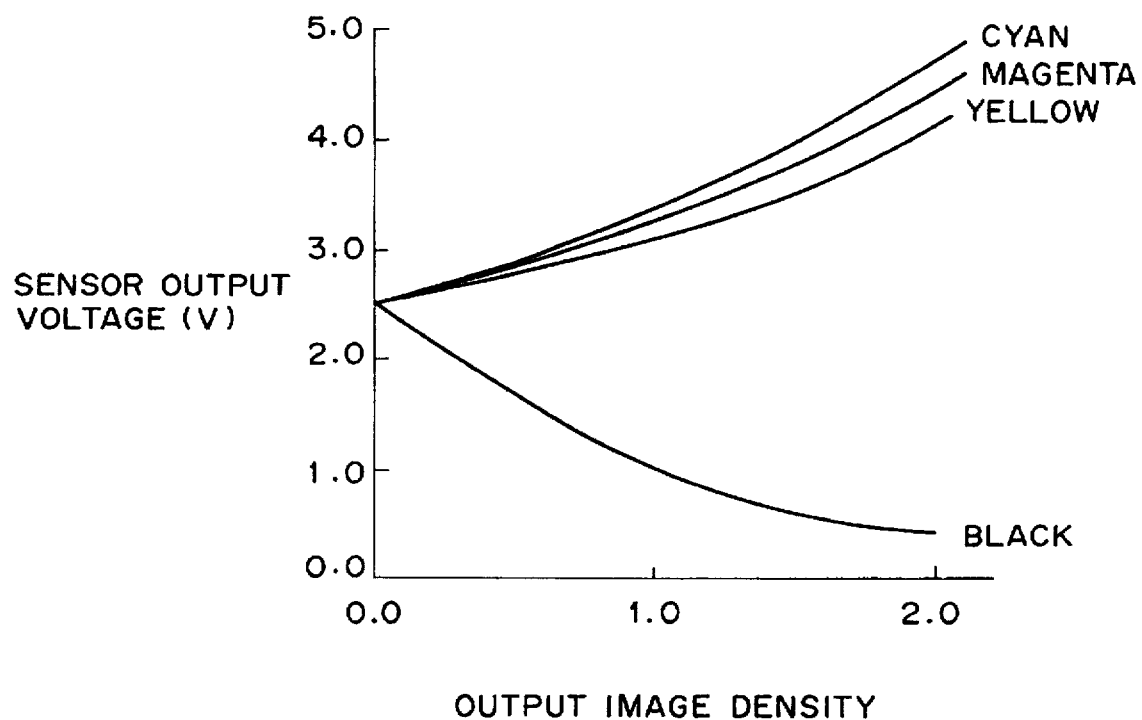
FIG. 8 is a chart showing the relation between the output image density and the sensor output.

FIG. 8 shows the relationship between the density signal level and the output of the sensor 9, when the density on the drum 4 is varied by pulse width modulated area gradation for each color, at an appropriate developer-toner concentration. The output of the sensor 9 is set at 2.5 V when the toner is not deposited on the drum 4. As shown in FIG. 8, the yellow, magenta or cyan toner provides more reflected light, than the photosensitive drum 4 itself, in response to an increase in the area covering rate corresponding to an increase in the density signal level, thereby providing a larger output signal from the sensor 9. On the other hand, the black toner provides less reflected light, than the photosensitive drum 4 itself, in response to an increase in the area covering rate corresponding to an increase in the density signal level, thereby providing a smaller output from the sensor 9.

These relationships allow to determine the state of output image from the sensor output, even with toners of different reflection characteristics, without actual image transfer and fixation on the copying sheet.

The present inventors also used a visible light source in combination with color separation filters and investigated the relation between the sensor output and the image density. FIG. 9 shows the relationship between the density signal level, obtained by measuring cyan toner through a red color separation filter with a main wavelength of 600 nm, and the sensor output. As shown in FIG. 9, a region with the output density of 1.0 or higher shows insufficient precision, as the sensor output shows little variation in this region. This is because the reproduction of gradation in the present embodiment is conducted by area modulation. In the high density area of the actual image, it was observed that the toner varied not only in the area but also in the thickness.

While the measurement with visible light provides a saturated signal once the photosensitive drum is covered with a single layer of toner particles, the infrared light penetrates into multiple toner layers, thus providing a higher saturation point since the near-infrared light has a higher transmittance than the visible light. Also, the near-infrared light is advantageous since the range of measurement can be made wider.

The wavelength of the near-infrared light is 960 nm in the present embodiment, but it is preferably selected within a range of 800 to 2000 nm in consideration of the spectral characteristics of the toner, photosensitive member, light source and photosensor. The range will be called the near-infrared light in the present invention.

Figure 15:
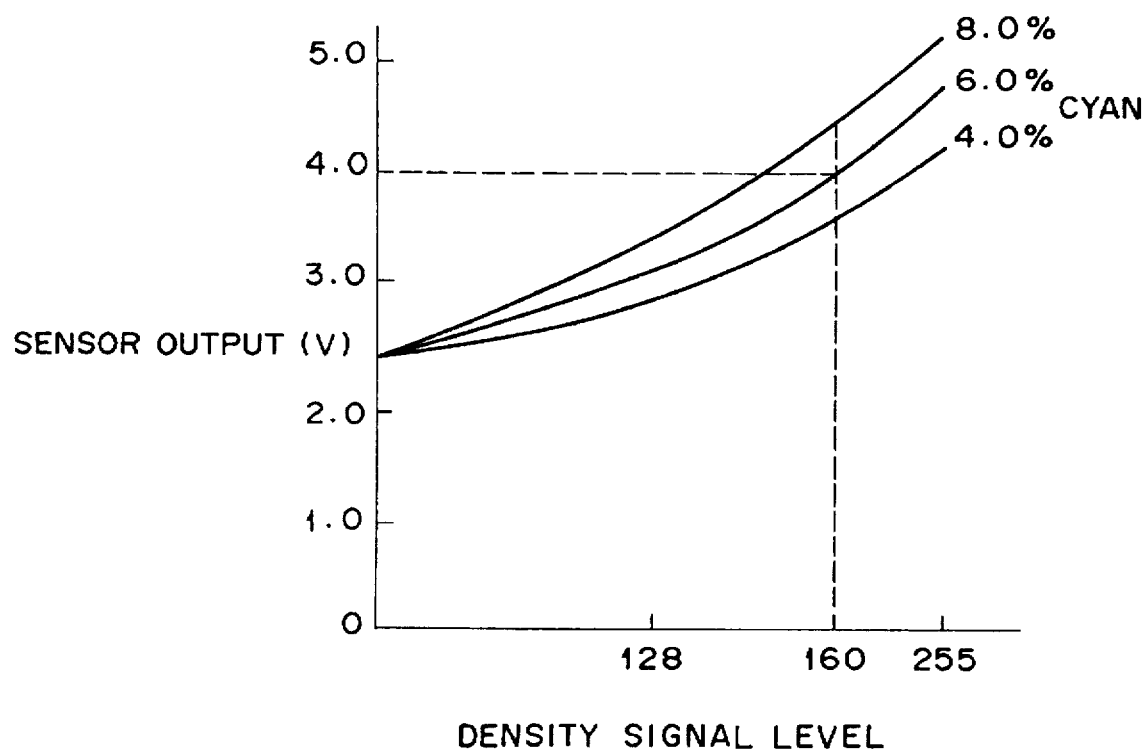
FIG. 15 is a chart showing an example of the relation between the density signal level and the sensor output when the developer concentration in cyan toner is varied.

FIG. 15 shows the relationship between the density signal level and the output of the sensor 9, when the developer-toner concentration for cyan color is varied.

The appropriate toner/carrier ratio, providing a sufficiently high maximum image density without background smear was 6.0%. This condition was selected as a standard setting for the present embodiment.

FIG. 15 also shows the relationships when the developer-toner concentration (toner/carrier ratio) was varied to 4.0 and 8.0%.

Figure 16:
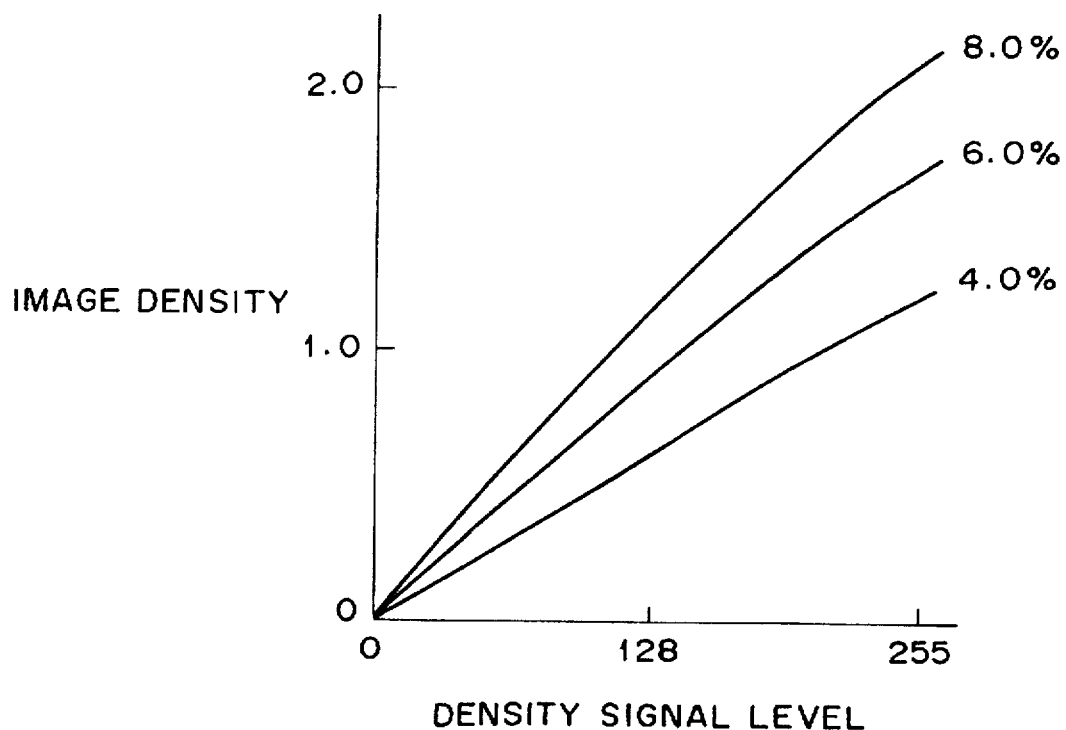
FIG. 16 is a chart showing an example of the relation between the density signal level and the image density when the developer concentration in cyan toner is varied.

FIG. 16 shows the relationship between the density signal level and the image density, when the developer concentration was varied.

A harder or softer gradation was obtained respectively at a higher or lower developer concentration.

It is already known that, in the electrophotographic process, the image becomes harder or softer, respectively, when the contrast potential is increased or decreased.

For cyan color, an image harder than standard and with a high maximum density was obtained when a specified pattern, formed on the image bearing member with a density signal level 160, provided an output higher than 4.0 V from the sensor 9. Thus the amount of decrease of the contrast potential was determined, based on the aberration of the output from 4.0 V, in order to correct the image to the standard state, and the image formation was conducted after the setting of the contrast potential in this manner.

Also, when the output of the sensor 9 is lower than 4.0 V, the amount of increase of the contrast potential was determined according to the aberration of the output from 4.0 V, and the image formation was conducted after the setting of the contrast potential in this manner.

The present embodiment could stabilize the color balance and the maximum image density, by storing, in advance, a combination of the density signal level providing an appropriate image and the sensor output, utilizing a single sensor for each of the cyan, magenta, yellow and black colors, and effecting the above-explained control for all the colors.

The above-explained control is preferably coducted before a copying or printing operation.

In the present embodiment, one-component magnetic toner was employed for the black color, but there is preferably used two-component black toner containing carbon. The carbon-containing black toner has spectral characteristics shown in FIG. 10. As will be apparent from FIG. 10, said carbon-containing black toner absorbs the near-infrared light in a similar manner to the black toner employed in the present embodiment, so that the output of the sensor decreases, from as compared to that of the photosensitive drum without the toner, as the image density increase. This relationship can be utilized for determining the output image in precise manner, both for color toners and black toner, without actual toner transfer and fixation on the copying sheet.

Also, in the present embodiment there is employed an LED emitting near-infrared light, but there may instead by employed a halogen lamp, in combination with a visible light cut-off filter.

Figure 11:
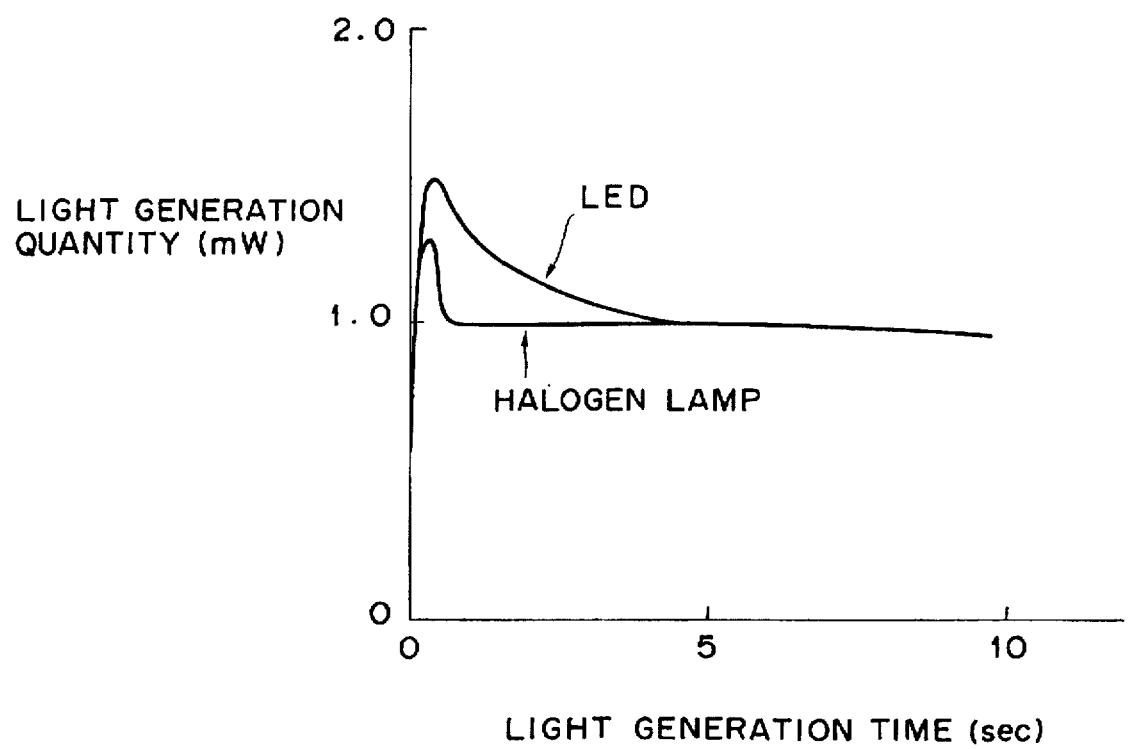
FIG. 11 is a chart showing the relation between lighting time of a halogen lamp and light emission thereof, in comparison with an LED.

The LED employed in the present embodiment has drawbacks in that the light amount is unstable for about 10 seconds after the start of lighting, and that the main wavelength is variable with temperature. On the other hand, the halogen lamp is stable in light output amount, and the visible light can be cut off with a filter having a transmission peak at ca. 950 nm. Thus the precision of measurement can be improved because of the stabler light amount. FIG. 11 shows the amount of emitted light as a function of lighting time, for an LED and a halogen lamp with a visible light cut-off filter.

[Embodiment 2]

Figure 17:
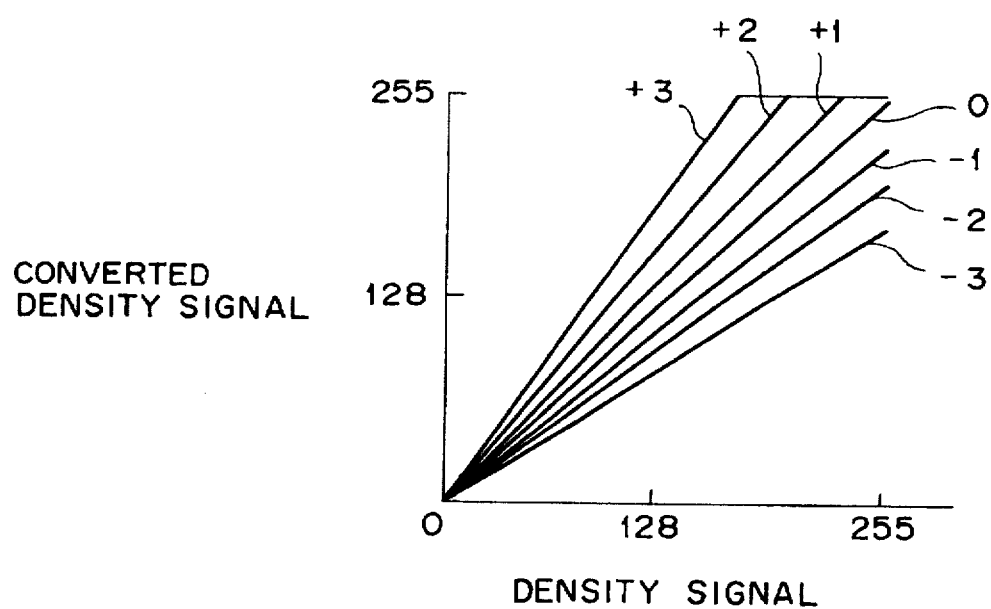
FIG. 17 is a chart showing an example of the look-up table.

It is already known that, in a full-color digital copying apparatus, gradation can be controlled by a look-up table (LUT) 25 for gamma-correction, FIG. 17 is a chart showing the property of the LUT 25 employed in the present embodiment, in which a line "0" stands for a standard gradation, while lines −1, −2 and −3 provide increasingly softer gradations in this order, and lines +1, +2 and +3 provide increasingly harder gradations.

Figure 13:
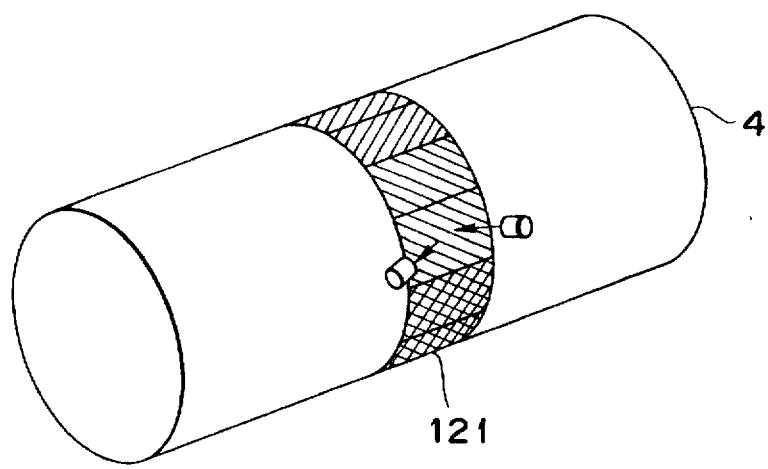
FIG. 13 is a view showing gradation of pattern.
Figure 18:
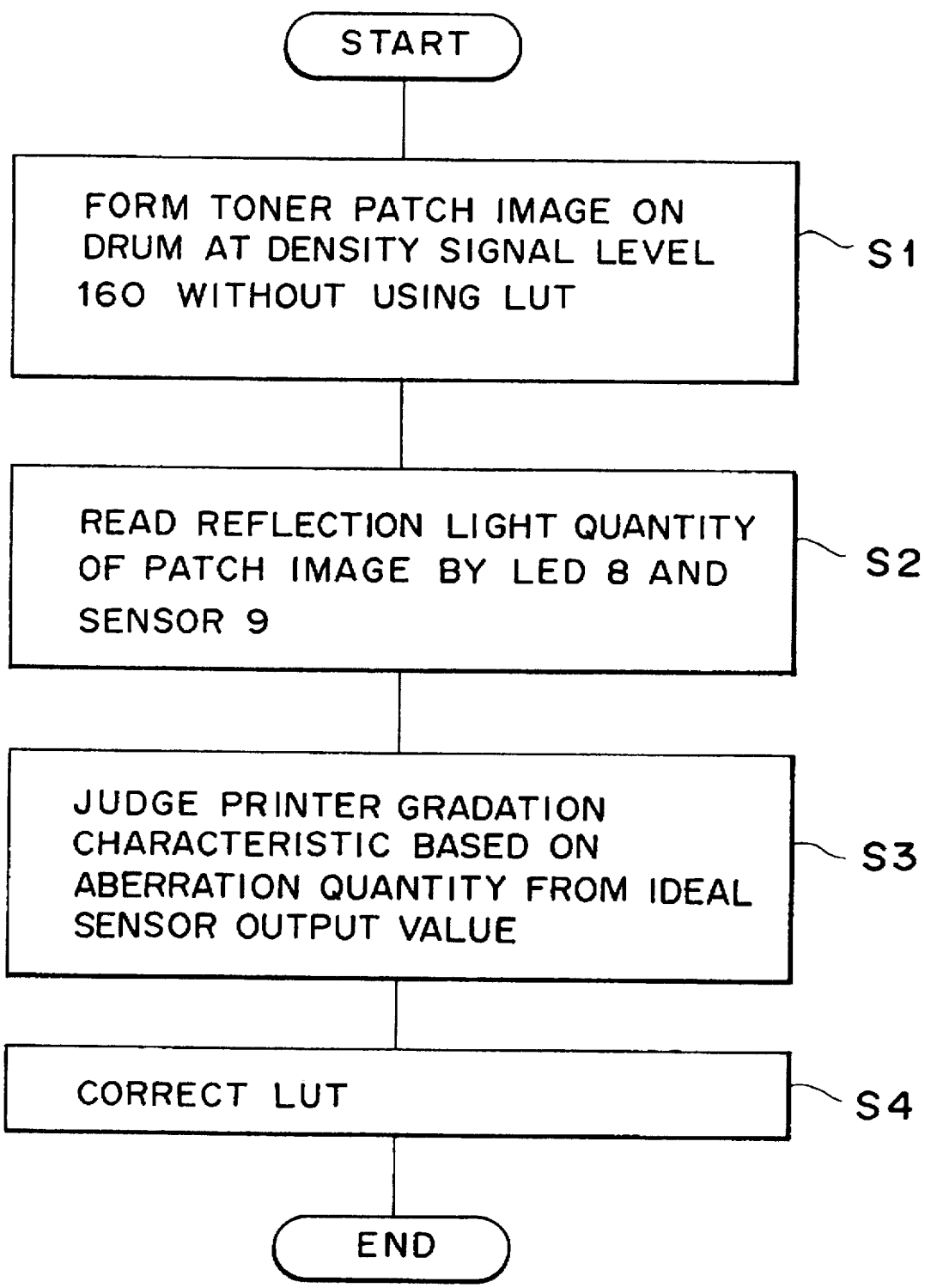
FIG. 18 is a flow chart showing the sequence of gradation control with a look-up table.

FIG. 18 is a flow chart showing the sequence of the present invention. At first a step S1 forms a toner patch with plural gradations on the drum with a density signal level 160 as shown in FIG. 13, without utilizing the LUT. Then a step S2 measures the output of the sensor when said toner patch reaches a position corresponding to the LED 8 and the sensor 9.

Then a step S3 judges the current gradation characteristics of the printer, based on the aberration from a sensor output measured in advance corresponding to the optimum image forming conditions for each color, and a step S4 corrects the LUT in such a manner that the gradation becomes equal to that obtained under the optimum image forming conditions.

The color balance can be stabilized by conducting the above-explained process for each color. [Embodiment 3]

In the foregoing embodiments, one-component magnetic toner was employed for black color, but the use of two-component black toner containing carbon is desirable in order to match the fixing temperature and other physical properties with those of cyan, yellow and magenta toners.

The carbon-containing toner has spectral characteristics shown in FIG. 10.

As will be apparent from FIG. 10, the carbon-containing black toner absorbs the near-infrared light in a similar manner to the one-component magnetic toner, thereby decreasing the sensor output, in comparison with the output corresponding to the reflection from the drum without toner.

This relationship can be utilizing for determining the state of output image, both for color toners and black toner, without actual toner transfer and fixation on the copying sheet. Therefore the carbon-containing black toner can be applied to the embodiments 1 and 2.

As the present embodiment utilizes two-component toner for black color, the gradation of black color becomes harder or softer when the toner concentration in developer is respectively made higher or lower, as in other colors.

Thus specified patterns were formed on the image bearing member with all the cyan, magenta, yellow and black toners, and the near-infrared reflectances were measured by a single sensor 9 at a suitable timing. The amount of toner replenishment was determined from the difference between each of the measured reflectance and a near-infrared reflectance of the same specified pattern, measured in advance corresponding to an appropriate toner concentration in the developer unit.

For example, for cyan toner with the characteristics shown in FIG. 15, the toner concentration (toner density) in the developing unit can be maintained constant, by not replenishing toner when the sensor output is higher than 4.0 V, indicating that the toner concentration is higher than the appropriate state, and by replenishing toner, if the sensor output is lower than 4.0 V, in proportion to the difference of the sensor output from 4.0 V.

The LUT for gamma correction may also be composed of a ROM or gage circuits. In such case there will be provided means for selecting suitable one from plural LUT's representing different gamma-correcting characteristics. Also the LUT may be replaced by calculation with a microcomputer.

Also the colors of toners to be employed are not limited to yellow, cyan, magenta and black mentioned above. For example there may be employed gray toner.

As explained in the foregoing, the present invention provides an advantage of allowing to measure the density of toners of plural colors on the image bearing member by means of single detecting means, by irradiating patterns on the image bearing member with near-infrared light and detecting the amount of near-infrared light reflected from the image bearing member.

The present invention is not limited to the foregoing embodiments, but is subject to various modifications within the scope and spirit of the appended claims.

What is claimed is:

1. A color image forming apparatus having a function of automatically adjusting a processing condition of a color image forming means, comprising:

pattern forming means for forming a visible pattern on a recording medium, utilizing recording materials of plural colors;

irradiation means for irradiating the visible pattern on the recording medium with near-infrared light;

detecting means for detecting the near-infrared light, emitted by said irradiation means and reflected by the recording medium; and adjusting means for adjusting the processing condition, utilizing the near-infrared light detected by said detecting means, wherein the recording materials include a plurality of types, one of which is a reflective type for the near-infrared light and another is an absorbing type for the near-infrared light, and the visible pattern is formed by using a monotonous increasing portion of the detected near-infrared light reflected from the reflective type recording material and a monotonous decreasing portion of the detected near-infrared light reflected from the absorbing type recording material.

2. An apparatus according to claim 1, wherein the recording materials are toner, which at least have either of reflective and absorbing characteristics for near-infrared light.

3. An apparatus according to claim 1, wherein said adjusting means includes gradation correcting means for detecting a density of the visible pattern, based on an amount of near-infrared light detected by said detecting means, and for correcting the gradation.

4. An apparatus according to claim 1, wherein said adjusting means is adapted to vary at least one of an amount of primary charging, developing bias, intensity of a light source of an image reader, light of an exposure unit, light emission time thereof, and a look-up table for gamma correction.

5. An apparatus according to claim 1, wherein said near-infrared light has a wavelength within a range from 800 to 2000 nm.

6. An apparatus according to claim 2, wherein said pattern forming means includes a developing unit, and said adjusting means includes toner concentration correcting means for correcting the toner concentration in said developing unit according to an amount of said near-infrared Light.

7. A color image forming apparatus comprising:

pattern forming means for forming a visible pattern on a recording medium, utilizing recording materials of plural colors;

irradiation means for irradiating the visible pattern on the recording medium with near-infrared light; and detecting means for detecting the near-infrared light, emitted by said irradiation means and reflected by the recording medium;

wherein the recording materials include a plurality of types, one of which is a reflective type for the near-infrared light and another is an absorbing type for the near-infrared light, and the visible pattern is formed by using a monotonous increasing portion of the detected near-infrared light reflected from the reflective type recording material and a monotonous decreasing portion of the detected near-infrared light reflected from the absorbing type recording material.

8. An apparatus according to claim 7, further comprising adjusting means for adjusting a forming condition of said pattern forming means, utilizing the near-infrared light detected by said detecting means.

9. An apparatus according to claim 8, wherein the recording materials are toner, which at least have either of reflective and absorbing characteristics for near-infrared light.

10. An apparatus according to claim 8, wherein said adjusting means includes gradation correcting means for detecting a density of the visible pattern, based on an amount of near-infrared light detected by said detecting means, and for correcting the gradation.

11. An apparatus according to claim 8, wherein said adjusting means is adapted to vary at least one of an amount of primary charging, developing bias, intensity of a light source of an image reader, light of an exposure unit, light emission time thereof, and a look-up table for gamma correction.

12. An apparatus according to claim 8, wherein said near-infrared light has a wavelength within a range from 800 to 2000 nm.

13. An apparatus according to claim 8, wherein said pattern forming means includes a developing unit, and said adjusting means includes toner concentration correcting means for correcting a toner concentration in said developing unit according to an amount of said near-infrared light.

14. A color image forming apparatus comprising:
pattern forming means for forming a visible pattern on a recording medium, utilizing recording materials of plural colors; and
mode selecting means for selecting either a first mode, for adjusting a condition of formation of the visible pattern by said pattern forming means, by irradiating the visible pattern on the recording medium with near-infrared light and detecting the near-infrared light reflected by the recording medium, or a second mode, for forming a visible pattern utilizing the condition adjusted in the first mode.
wherein the recording materials include a plurality of types, one of which is a reflective type for the near-infrared light and another is an absorbing type for the near-infrared light, and
the visible pattern is formed by using a monotonous increasing portion of the detected near-infrared light reflected from the reflective type recording material and a monotonous decreasing portion of the detected near-infrared light reflected from the absorbing type recording material.

15. An apparatus according to claim 14, wherein the recording materials are toner, which at least have either of reflective and absorbing characteristics for near-infrared light.

16. An apparatus according to claim 14, wherein said near-infrared light has a wavelength within a range from 800 to 2000 nm.

17. A color image forming apparatus having a function of automatically adjusting a processing condition of a color image forming means, comprising:
pattern forming means for forming a visible pattern on a recording medium, utilizing recording materials of plural colors;
irradiation means for irradiating the visible pattern on the recording medium with light;
photoelectric conversion means for converting the light, emitted by said irradiation means and reflected by the recording medium, into an electrical signal; and
adjusting means for adjusting the processing condition, utilizing the electrical signal output from said photoelectric conversion means,
wherein the electrical signal from said photoelectric conversion means includes an offset value which corresponds to a reflection characteristic of the recording materials of plural colors, including black.

18. An apparatus according to claim 17, wherein said irradiation means is adapted to emit near-infrared light.

19. An apparatus according to claim 18, wherein the recording materials are toner, which at least have either of reflective and absorbing characteristics for near-infrared light.

20. An apparatus according to claim 18, wherein said adjusting means included gradation correcting means for detecting a density of the visible pattern, based on an amount of near-infrared light detected by said detecting means, and for correcting the gradation.

21. An apparatus according to claim 18, wherein said adjusting means is adapted to vary at least one of an amount of primary charging, developing bias, intensity of a light source of an image reader, light of an exposure unit, light emission time thereof, and look-up table for gamma correction.

22. An apparatus according to claim 18, wherein said near-infrared light has a wavelength within a range from 800 to 2000 nm.

23. An apparatus according to claim 18, wherein said pattern forming means includes a developing unit, and said adjusting means includes toner concentration correcting means for correcting a toner concentration in said developing unit according to an amount of said near-infrared light.

24. A method of automatically adjusting a process condition of a color image forming means, comprising the steps of:
forming a visible pattern on a recording medium, utilizing recording materials of plural colors;
irradiating the visible pattern on the recording medium with near-infrared light;
detecting the near-infrared light emitted in said irradiating step and reflected by the recording medium; and
adjusting a processing condition, utilizing the near-infrared light detected in said detecting step,
wherein the recording materials include a plurality of types, one of which is a reflective type for the near-infrared light and another is an absorbing type for the near-infrared light, and
the visible pattern is formed by using a monotonous increasing portion of the detected near-infrared light reflected from the reflective type recording material and a monotonous decreasing portion of the detected near-infrared light reflected from the absorbing type recording material.

25. A method of detecting a condition of a recording medium, comprising the steps of:
forming a visible pattern on a recording medium, utilizing recording materials of plural colors;
irradiating the visible pattern on the recording medium with near-infrared light; and
detecting the near-infrared light emitted in said irradiating step and reflected by the recording medium,
wherein the recording materials include a plurality of types, one of which is a reflective type for the near-infrared light and another is an absorbing type for the near-infrared light, and the visible pattern is formed by using a monotonous increasing portion of the detected near-infrared light reflected from the reflective type recording material and a monotonous decreasing portion of the detected near-infrared light reflected from the absorbing type recording material.

26. A color image forming method comprising the steps of:

forming a visible pattern on a recording medium, utilizing recording materials of plural colors; and selecting between a first mode, for adjusting a condition of formation of the visible pattern in said pattern forming step, by irradiating the visible pattern on the recording medium with near-infrared light and detecting the near-infrared light reflected by the recording medium, and a second mode, for forming the visible pattern utilizing the condition adjusted in the first mode, wherein the recording materials include a plurality of types, one of which is a reflective type for the near-infrared light and another is an absorbing type for the near-infrared light, and the visible pattern is formed by using a monotonous increasing portion of the detected near-infrared light reflected from the reflective type recording material and a monotonous decreasing portion of the detected near-infrared light reflected from the absorbing type recording material.

27. A method of automatically adjusting a process condition of a color image forming means, comprising the steps of:

forming a visible pattern on a recording medium, utilizing recording materials of plural colors;

irradiating the visible pattern on the recording medium with light;

photoelectrically converting the light, emitted in said irradiating step and reflected by the recording medium, into an electrical signal; and adjusting the processing condition, utilizing the electrical signal converted in said converting step, wherein the electrical signal converted in said converting step includes an offset value which corresponds to a reflection characteristic of the recording materials of plural colors, including black.

* * * * *

UNITED STATES PATENT AND TRADEMARK OFFICE
CERTIFICATE OF CORRECTION

PATENT NO. : 5,697,012

DATED : December 9, 1997

INVENTORS : NOBUATSU SASANUMA ET AL.

It is certified that error appears in the above-identified patent and that said Letters Patent is hereby corrected as shown below:

ON THE TITLE PAGE

[57] ABSTRACT line 5,   "drum" should read --drum,--.

COLUMN 2 line 2,   "said" should read --the--.

COLUMN 3 line 55,   "10" should be deleted.

COLUMN 4 line 22,   "4," should read --4--.

COLUMN 5 line 12,   "lights," should read --light--.

UNITED STATES PATENT AND TRADEMARK OFFICE
CERTIFICATE OF CORRECTION

PATENT NO. : 5,697,012

DATED : December 9, 1997

INVENTORS : NOBUATSU SASANUMA ET AL.

Page 2 of 2

It is certified that error appears in the above-identified patent and that said Letters Patent is hereby corrected as shown below:

<u>COLUMN 6</u> line 35, "from" should be deleted;
line 36, "increase." should read --increases.--.
line 58, "gamma-correction," should read --gamma-correction.--.

<u>COLUMN 8</u> line 51, "Light." should read --light.--.

Signed and Sealed this

Eleventh Day of August 1998

Attest:

BRUCE LEHMAN

*Attesting Officer*   *Commissioner of Patents and Trademarks*